Patented June 3, 1952

2,599,471

UNITED STATES PATENT OFFICE 2,599,471

OCTAHYDROPHENANTHRENE CARBOXYLIC ACID ESTERS AND PROCESS OF MAKING SAME

Karl Miescher, Riehen, and Georg Anner, Basel, Switzerland, assignors to Ciba Pharmaceutical Products, Inc., Summit, N. J.

No Drawing. Application March 29, 1948, Serial No. 17,796. In Switzerland April 11, 1947

3 Claims. (Cl. 260—473)

The present invention relates to the preparation, in isolated form, of diastereoisomeric 1-keto-2-alkyl-1,2,3,4,9,10,11,12-octahydrophenanthrene-2-carboxylic acid esters which contain in 7-position a substituent convertible into a hydroxyl group by hydrolysis. More particularly, it has especial relation to a process for the separation, into its diastereoisomers, of the conventional diastereoisomeric mixture of the said esters.

Such esters can be used, for example, as starting materials for the synthesis of estrone and its homologues. However, in the manufacture of these esters diastereoisomeric mixtures are obtained. Thus, Bachmann and co-workers [Journal of the American Chemical Society, vol. 64, pages 974–982 (1942)] obtained 1-keto-2-methyl-7-methoxy-1,2,3,4,9,10,11,12-octahydrophenanthrene-2-carboxylic acid methyl ester in the form of an oil. Robinson and Walker (Journal of the Chemical Society of London, 1936, pages 747–752, and 1938, pages 183–188) describe the ethyl ester, also as an oil. In order to use such compounds for estrone synthesis it would obviously be of great advantage if the components of the diastereoisomeric mixtures could be separated from one another. However, such separation has heretofore not been realized.

A primary object of the present invention is to realize the desideratum of effecting the aforesaid separation.

The present invention is based on the unexpected discovery that such desideratum may be realized, that is, that the components of diastereoisomeric mixtures of esters of 1-keto-2-alkyl-1,2,3,4,9,10,11,12-octahydrophenanthrene-2-carboxylic acids, which contain in the 7-position a substituent convertible by hydrolysis into a hydroxyl group, can be separated from one another by subjecting the mixture to a fractionating treatment.

The starting materials may contain in the 7-position, for example, an etherified or esterified hydroxyl group, such as an alkoxy, for example, a methoxy or ethoxy group, an aralkoxy group such as a benzyloxy group, or an acyloxy group such as an acetoxy group, and may contain in the 2-position especially a methyl group or another alkyl group such as an ethyl or propyl group. Advantageously there is used as a starting material a 1-keto-2-methyl-7-alkoxy-1,2,3,4,9,10,11,12-octahydrophenanthrene-2-carboxylic acid methyl ester, especially the 1-keto-2-methyl-7-methoxy-1,2,3,4,9,10,11,12-octahydrophenanthrene-2-carboxylic acid methyl ester. It has been unexpectedly observed that the individual diastereoisomers in part exhibit very great differences in solubility and can be obtained in crystalline form. They serve, for example, as starting materials for the production of the corresponding individual doisynolic acids or estrones.

The fractionating treatment is preferably carried out with the aid of solvents. Thus, fractional crystallization from an organic solvent such, for example, as acetone, methanol, ethanol or the like, is especially advantageous. It is also possible to make use of chromatography with the aid of a suitable adsorbent such as aluminum oxide, calcium oxide or the like, and to elutriate with different solvents, or to extract with mixtures of solvents such, for example, as a mixture of acetone, water and chloroform. The separation may alternatively be carried out by sublimation or the like. The process of the invention may utilize one of these methods alone or a combination thereof. Thus, for example, the diastereoisomeric mixtures may be dissolved in a solvent such as acetone, and allowed to crystallize at different temperatures. It is often desirable to change the solvent, so that methanol or ethanol, for example, may be used instead of acetone. The fractions obtained by these crystallizations may then be further purified by chromatography, for example, over aluminum oxide, and/or by sublimation.

The diastereoisomeric mixtures to be separated are prepared by known methods. For this purpose there is advantageously used a γ-tetralyl-(1)-butyric acid ester which contains in the 2-position an esterified carboxyl group and in the 7-position a substituent convertible by hydrolysis into a hydroxyl group. From such an ester there is obtained by the Dieckmann condensation the corresponding β-keto-acid ester, which is then alkylated to form the desired 1-keto-2-alkyl-1,2,3,4,9,10,11,12-octahydrophenanthrene-2-carboxylic acid ester. The same compounds are obtained by converting a 1-keto-1,2,3,4,9,10,11,12-octahydrophenanthrene, which contains in the 7-position a substituent convertible by hydrolysis into a hydroxyl group, into its 2-oxalate, and alkylating the latter, after splitting off carbon monoxide, to form the desired β-keto-acid ester.

The products of the invention may be used as starting materials for the manufacture of medicaments.

The following example illustrates the invention, the parts being by weight unless otherwise stated, and the relationship of parts by volume to parts by weight being the same as that of the gram to the cubic centimeter:

Example

The starting material may be prepared, for example, as follows:

An ethereal solution of diazo-methane is run at about −5° C., while stirring, into a suspension in 300 parts by volume of acetone of 40 parts of γ-(6-methoxy-2-carboxy-tetralyl-1)-butyric acid, melting at 151–156° C. and having the formula

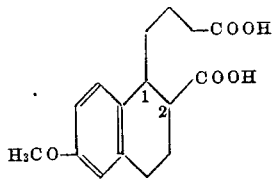

until the acid has completely dissolved. The crude dimethyl ester obtained by evaporating the solvent is a pale yellow oil, and is dissolved without further purification in 400 parts by volume of benzene. Sodium methylate, obtained by dissolving 5.86 parts of sodium in methanol and evaporating the solution to dryness, is added to the benzene solution, and the mixture is boiled for 8 hours in an atmosphere of nitrogen, while stirring. The sodium salt of 1-keto-7-methoxy-1,2,3,4,9,10,11,12-octahydrophenanthrene-2-carboxylic acid methyl ester is thereby precipitated in the form of a slightly colored crystalline mass. 130 parts by volume of methanol and 130 parts by volume of methyl iodide are then added to the cooled reaction mixture. After standing at room temperature overnight, the whole is boiled in a reflux apparatus for one hour. The reaction mixture, while cooled with ice, is rendered weakly acid with dilute acetic acid and, after the addition of ether, is extracted with a dilute solution of sodium carbonate and water. After being dried, the benzene-ether solution is evaporated to yield the diastereoisomeric mixture of 1-keto-2-methyl-7-methoxy-1,2,3,4,9,10,11,12-octahydrophenanthrene-2-carboxylic acid methyl esters of the formula

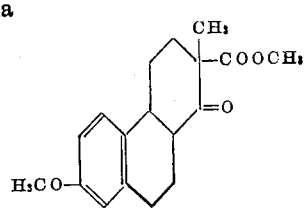

in the form of a pale brown oil. For the purpose of separating the individual diastereoisomers the crude reaction product is dissolved in about 200 parts by volume of hot acetone, and the following fractions are obtained:

*Fraction A.*—Upon cooling to room temperature there crystallize 14.3 parts of a product, which melts at 129–131° C. after sublimation under greatly reduced pressure, and is obtained in the form of water-clear prisms melting at 132–134° C. after recrystallization from acetone.

*Fraction B.*—The mother liquor remaining after the recovery of fraction A is placed in the cold, whereupon a further crystal fraction precipitates. It forms a crystallizate of non-uniform appearance amounting to 5 parts and melting at 93–103° C. It is dissolved in acetone, and allowed to crystallize slowly at room temperature. The product which first precipitates melts at 120–125° C. By repeated dissolution in acetone and slow crystallization there are obtained from the latter product water-clear rhombic plates melting at 127–128° C.

The mother liquor remaining after the recovery of the above mentioned product melting at 120–125° C. is mixed with methanol, concentrated by evaporation, allowed to crystallize, and the product so obtained is sublimed and repeatedly recrystallized from acetone. In this manner a further portion of prisms melting at 132–134° C. which product is identical with that obtained by fraction A is isolated. The two diastereoisomeric keto-esters obtained by fractions A and B, when mixed together, exhibit a considerable depression in melting point.

The separation of fraction B into the two keto-esters melting at 132–134° C., respectively at 127–128° C. may alternatively be carried out by dissolution in a mixture of benzene and petroleum ether, adsorption over aluminum oxide, and elutriation with petroleum ether.

*Fraction C.*—The mother liquor remaining after the removal of fraction B is concentrated to one half its bulk by evaporation, and allowed to crystallize in a cooling cabinet. By filtering with suction there are obtained 7 parts of a gummy product which melts unsharply at 50–60° C. It is then again crystallized from methanol, whereby the melting point is increased to 87–89° C. The fraction thus purified forms thick rhombic crystals.

*Fraction D.*—The brown oil obtained after evaporating the mother liquor remaining from the recovery of fraction C does not crystallize even after prolonged standing in the cold. For the purpose of further purification it is distilled under greatly reduced pressure, whereby under a pressure of 0.05 mm. and at 170–180° C., 6.5 parts of a colorless oil are obtained. The latter oil is stirred with an equal volume of methanol, and allowed to stand for a long time in the cooling cabinet. By then about one half of the product will have crystallized, and it is separated by filtering with suction and the gummy product is washed with a small quantity of methanol. There is obtained from the latter by repeated recrystallization from a mixture of acetone and methanol the diastereoisomeric keto-ester in the form of lustrous platelets melting at 101–102° C.

The separation of the individual fractions can also be carried out by dissolving the crude diastereoisomeric mixture in a mixture of benzene and petroleum ether in the ratio 1:3, adsorbing the components on aluminum oxide, elutriating with petroleum ether, and recrystallizing the fractions so obtained.

While the foregoing example is concerned with the methyl esters of 1-keto-2-methyl-7-methoxy-1,2,3,4,9,10,11,12-octahydrophenanthrene-2-carboxylic acid, it can also be carried out with other 7-alkoxy compounds.

Having thus described the invention, what is claimed is:

1. A process for the isolation of individual diastereoisomers of 1-keto-2-lower-alkyl-7-lower-alkoxy-1,2,3,4,9,10,11,12-octahydrophenanthrene-2-carboxylic acid esters from a diastereoisomeric mixture thereof, which comprises subjecting the diastereoisomeric mixture of the said esters to a fractional crystallization with the aid of acetone.

2. A process for the isolation of individual diastereoisomers of 1-keto-2-methyl-7-lower-alkoxy-1,2,3,4,9,10,11,12-octahydrophenanthrene-2-carboxylic acid methyl esters from a diastereoisomeric mixture thereof, which comprises subjecting the diastereoisomeric mixture of the said esters to a fractional crystallization with the aid of acetone.

3. A process for the isolation of individual diastereoisomers of 1 - keto-2-methyl-7-methoxy-1,2,3,4,9,10,11,12 - octahydrophenanthrene- 2 - carboxylic acid methyl ester from a diastereoisomeric mixture thereof, which comprises subjecting the diastereoisomeric mixture of the said ester to a fractional crystallization with the aid of acetone.

KARL MIESCHER.
GEORG ANNER.

REFERENCES CITED

The following references are of record in the file of this patent:

Bachmann et al., J. Am. Chem. Soc., vol. 64, pp. 974–982 (1942). Robinson et al., J. Chem. Soc. (London), vol. 1936, pp. 747–752. Robinson et al., J. Chem. Soc. (London), vol. 1938, pp. 183–188. Gatterman, "Organic Chemistry," (Macmillan), pp. 1–14 (1896). Karrer, "Organic Chemistry," Nordeman, p. 92 (1938).